United States Patent [19]
Fretwell et al.

[11] 3,852,531
[45] Dec. 3, 1974

[54] ANSWER-ORIGINATE DATA COMMUNICATION SYSTEM

[75] Inventors: Richard D. Fretwell; James W. Azbell, both of Columbus, Ohio

[73] Assignee: Design Elements, Inc., Columbus, Ohio

[22] Filed: Feb. 5, 1971

[21] Appl. No.: 112,954

Related U.S. Application Data

[63] Continuation-in-part of Ser. No. 76,793, Sept. 30, 1970, abandoned.

[52] U.S. Cl. .......... 179/2 DP, 178/66 R
[51] Int. Cl. .......... H04m 11/06
[58] Field of Search .......... 179/2 DP, 3, 4; 325/30, 325/320; 178/58, 66 R, 66 A

[56] References Cited

UNITED STATES PATENTS

| | | | |
|---|---|---|---|
| 3,031,527 | 4/1962 | Barton | 178/66 R |
| 3,226,480 | 12/1965 | Wright | 179/2 DP |
| 3,353,102 | 11/1967 | Meyers | 325/30 |
| 3,370,240 | 2/1968 | Kageyama | 178/66 R |
| 3,470,473 | 9/1969 | Gilman | 178/66 R |
| 3,524,935 | 8/1970 | Gonsewski | 179/2 DP |
| 3,544,721 | 12/1970 | Geen | 179/2 DP |
| 3,549,809 | 12/1970 | Stehr | 179/2 DP |
| 3,577,201 | 5/1971 | Quatse | 179/2 DP |
| 3,581,220 | 5/1971 | Bell | 325/320 |
| 3,597,546 | 8/1971 | Zehr | 179/2 DP |
| 3,601,634 | 8/1971 | Ebertin | 307/205 |
| 3,641,366 | 2/1972 | Fujimoto | 307/205 |

OTHER PUBLICATIONS

"Voice Band Data Sets" Talcott Automatic Electric Technical Journal, June 1966, pp. 98–105.

"Data Trans. System Auto. Control Device" IBM Technical Disclosure, July 1966, Vol. 9, No. 2, p. 144.

*Primary Examiner*—Kathleen H. Claffy
*Assistant Examiner*—Thomas D'Amico
*Attorney, Agent, or Firm*—Cennamo, Kremblas & Foster

[57] ABSTRACT

A direct access (hardwired) modem usable also as an acoustical data coupler by means of an acoustic adaptor, having receive and transmit sections, for communicating with a time shared computer or with another remote data terminal over the conventional telephone and telephone lines. The "originate" section is distinguished from the "answer" section in that the transmit and receive tones are interchanged so that the transmitter of one is on the same frequency as the receiver of the other. The data call may be initiated at either end for manual or automatic answering and automatic disconnect at the other end. Improved circuitry in the filter, limiter, discriminator, switching units, and the over-all circuitry of all of the units provide error free transmission and operation at a higher baud rate comparable to more complex and higher cost units. The particular circuitry described is that of modem of the direct access type.

12 Claims, 8 Drawing Figures

INVENTORS
RICHARD D. FRETWELL
JAMES W. AZBELL

BY

Cennamo Kremblas & Foster
ATTORNEYS

INVENTORS
RICHARD D. FRETWELL
JAMES W. AZBELL
BY
Cennamo Kremblas & Foster
ATTORNEYS INVENTORS
RICHARD D. FRETWELL
JAMES W. AZBELL
BY
Cennamo, Kremblas & Foster
ATTORNEYS INVENTORS
RICHARD D. FRETBELL
JAMES W. AZBELL
BY
Cennamo Kremblas & Foster
ATTORNEYS

INVENTORS
RICHARD D. FRETWELL
JAMES W. AZBELL
BY
ATTORNEYS

INVENTORS
RICHARD D. FRETWELL
JAMES W. AZBELL
BY
Cennamo Kremblas & Foster
ATTORNEYS INVENTORS
RICHARD D. FRETWELL
JAMES W. AZBELL
BY
Cennamo Kremblas & Foster
ATTORNEYS

ANSWER-ORIGINATE DATA COMMUNICATION SYSTEM

CROSS REFERENCE

This application is a continuation-in-part of copending patent application, Ser. No. 76,793, filed Sept. 30, 1970, for "Acoustic Coupler," by Richard D. Fretwell and James W. Azbell, and assigned to Design Elements, Inc., now abandoned.

BACKGROUND OF THE INVENTION

Computer availability for time-sharing and their adaptability to present day needs has been very instrumental to an increased use. However, it is the interfacing equipment that has realistically and practically brought the user to the computer. The most instrumental link of a user to a time shared computer is the telephone and the telephone systems. Therefore, component speaking, the intefacing equipment has received the most concerted effort development-wise in recent years. The results have been successful — computers or other data terminals are in use by many times the number of businesses than those that can afford to purchase or lease such equipment.

In the general class of interfacing equipment is the data coupler. A data coupler is a device that allows the transmission and receipt of information from one point to another over ordinary telephone lines. The coupling equipment, apparatus and systems provide for the digital signals from the subscriber's data terminal equipment to be converted to audible frequency-shifted tones for transmission via the telephone lines. The tones when received by the distant telephone instrument are converted into their digital equivalents as required by the data terminal equipment.

A data coupler is the same as a "modem" in the strict sense of the word. Modem was derived from the combination of the words "modulate" and "demodulate" — hence "modem." Modulation and demodulation takes place in all data couplers. In industry usage, however, the term "data coupler" has come to be applied to devices operating at under 300 baud, whereas "modem" is used for devices operating at 1,200 thru 9,600 baud range.

A unit of measurement related to data transmission rates — the number of times the line condition changes per second — is the "baud." For instance, going for 0 to +5 volts would be 1 baud, whereas a change from +5 volts back to 0 would be another baud. Since the information being transmitted is in the form of electrical signal changes, the amount of data that can be transmitted per unit of time is a function of the transmission rate, or bauds. The technical requirements of transmitting signals over a telephone line at 300 baud is considerably less than that required for the 1,200 thru 9,600 baud range. The physical and electrical characteristics of the telephone line and related equipment are of significant importance as the transmission rates increase. The compensation and equalization circuitry required at these higher rates are quite complicated, which in turn considerably increase the complexity and price of high speed modems.

There are two different types of data couplers in commercial use — "acoustic" and "direct access" couplers. The acoustic type utilizes the telephone handset at all times and generally is used only at the lower data rates below 300 baud. At the higher data rates the poor frequency response of the microphones in the telephone handset, i.e., its inability to reproduce the high baud rates, restricts the use of acoustic couplers.

The "direct access" type modem does not utilize the telephone handset; instead, the modem is wired directly into the telephone company's electrical circuits. A direct access (or hardwired) modem provides a higher degree of data transmission reliability. The monthly charge for the DAA is the main disadvantage to direct access modems, as well as the lack of portability.

Acoustic and direct access couplers are commercially available as originate only, answer only, and originate and answer. In operation of a data transmission set, one terminal is in the originate mode and one is in the answer mode. Different frequencies are used to transmit and receive data over the same line simultaneously. The receive frequency of one unit is the transmit frequency of the other unit. The prior art originate only and the answer only data couplers do not allow these frequencies to be interchanged. An originate only data coupler must therefore operate with a different data coupler in the answer mode. An originate and answer data coupler allows the operator to interchange the transmit and receive frequencies, so that the unit may be switched to transmit and receive information from another coupler in either the originate or the answer mode.

Prior art data terminal-telephone link interface communication equipment is much similar to other electronic equipment in their initial stages of development. That is, the equipment is extremely bulky and expensive to achieve sophisticated operation or is stripped down for cost at a sacrifice to quality performance.

SUMMARY OF THE INVENTION

The present invention is for a data coupler of the direct access type for communication of digital information over the standard type of telephone and telephone link to a time shared computer, Teletype, or other data terminal. The coupler includes a receive section and a transmit section with interchangeability of the transmit and receive frequencies. The conversion of the digital signals to frequency shift keyed carrier signals in the transmit section and the conversion of the signals back to the digital signals in the receive section comprises all of the basic circuitry — but with improved circuitry in specific areas to provide a high noise rejection rate and error free transmission with simplicity in design at minimum cost. Specifically, additional filtering, a new limiter circuit, and a new discriminator is provided, together with a complete field effect transistor switching system for circuit switching from originate to answer modes and vice versa. Other sophisticated operational circuitry includes an automatic answering service with an answer abort timer and terminal motor control circuits.

OBJECTS OF THE INVENTION

It is accordingly a principal object of the present invention to provide a new and improved combination of components comprising a data coupler for interfacing data terminals via a telephone link, that is simple in design with full accuracy and reliability in operation.

Another object of the present invention is to provide a data coupler that is of the direct access or hardwired type coupled to a standard conventional telephone system.

A further object is to provide a coupler of the direct access type that utilizes improved circuitry in the essential components that provide error free transmission at a higher baud rate.

Still another object is to provide circuitry for automatic or manual answering together with standby circuitry for controlled operation.

Other and further objects of the present invention will become apparent from the following detailed description when taken in conjunction with the drawings in which:

DESCRIPTION OF THE PREFERRED EMBODIMENTS

Figure 5:
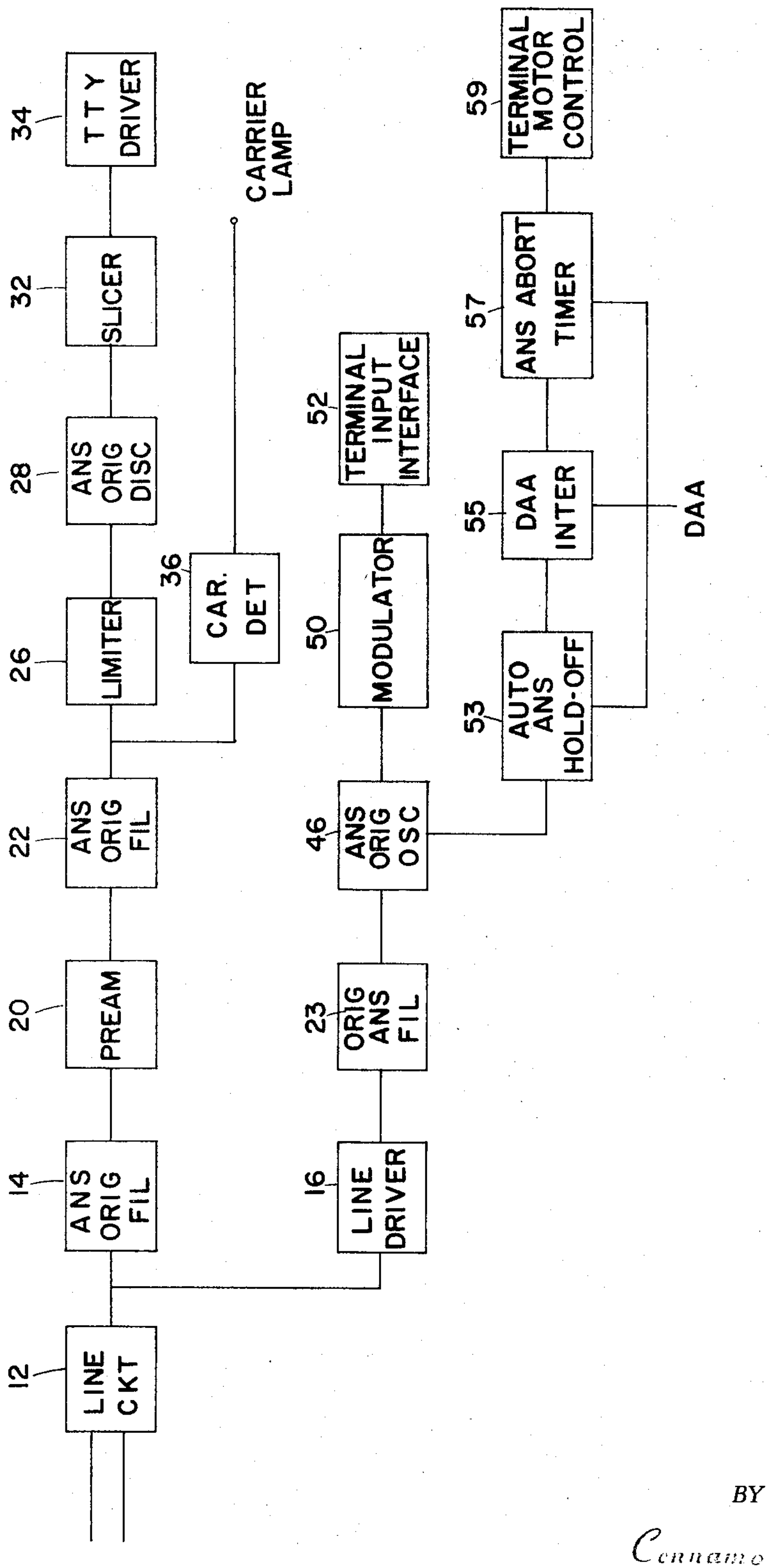
FIG. 5 is a simplified schematic illustration of the electrical circuitry illustrating the operational originate and answer modes.

Referring now generally to FIG. 5, a preferred embodiment is shown utilizing the data coupler in combination with a standard type of telephone. In this particular embodiment the coupler is wired directly into the telephone as a direct access modem; however, an acoustic coupling system as shown and described in our copending patent application, supra, may also be utilized. The data communication system provides for the digital signals from the subscriber's data terminal equipment to be converted to an audible frequency-shifted tones for transmission via the telephone lines. The tones when received by the distant telephone instrument are converted into their digital equivalents as required by the data terminal equipment.

In operational sequence the received signals from the line circuit 12 are filtered in the answer or originate line filters 14 prior to being fed to the preamplifier 20. The preamplifier 20 is an integrated circuit operational amplifier with feedback to provide sufficient gain. The amplifier output of the preamplifier 20 is filtered — depending on its operational mode — either in the answer or originate bandpass filter 22 or in the originate or answer bandpass filter 23. The bandpass filters 22 and 23 have the function of passing the two frequencies of use while rejecting noise and other transient frequency signals. The two sets of filters provide more attenuation between the transmit signal and the receive signal thereby permitting reception at a lower level and transmission at a higher level.

The carrier detector 36 is operative to determine the presence of a sufficiently large receive tone. The output signal of the detector is operational to drive lamp 27 when a sufficient receive carrier signal is present. The amplified signal — data set ready — from carrier detector 36 is also connected to the Teletype driver 34 as hereinafter set forth and to the limiter 26. The limiting action causes a "capture" effect on the signal and thereby discriminates against noise. The output of the limiter 26 is of constant amplitude and approximates a square wave. The tone signals from the limiter 26 are fed to the originate discriminator 28 or answer discriminator 29. In either of the discriminator circuits 28 or 29 the two frequency signals are detected.

The bipolar output signal from the originate discriminator — positive when lower than 2,125 Hz and negative when higher than 2,125 Hz — is fed to the slicer 32. The purpose of the slicer 32 is to amplify and further increase the signal-to-noise ratio of the detected signal. The output of the slicer 32 is fed to the Teletype driver 34 simultaneously with the output of the carrier detector 36 — as mentioned above.

The Teletype driver 34 combines the data signal from the slicer 20 and the carrier present signal from the detector 36 with an output that is a constant current pulse.

The automatic answer hold-off circuit 53, the DAA interface circuit 55, the answer abort timer 57 and the terminal motor control circuit 59 are not in the original circuitry of the acoustic coupler described in the copending patent application. The purpose of the abort timer 57 is to set a time limit between the call signal and the reception of data. In operation when in the automatic answer mode a ring will be detected initiating the timer 57. If data is not received within the predetermined period of time — for instance 30 seconds — the answer abort timers 57 disconnects the telephone line from the coupler. The equipment is restored to its prering condition and awaits another ring. On the other hand, if data is received within the time allotted, the interface circuit 55 is held in the "on" position by the carrier detector 36. The circuit continues in this position as long as data is being received.

The direct access arrangement (DAA) interface circuit is basically the circuit that controls the telephone line by using the on-hook, off-hook lead (OH lead). The direct access arrangement (provided by the telephone company) gives a signal which initiates the timer 57. The telephone line is then connected to the off-lead connecting the telephone to the line. When no data is received or when the reception of data is completed, the timer will have timed off and the off-lead will switch to on-hook and await another call.

In the manual answer mode the ring-input ground is made to simulate the ring at all times. This disables the answer abort timer completely — forcing the OH lead to be off-hook continuously.

In the auto-answer mode when a ring is received the answer abort timer starts and a very short time later (2 to 5 seconds) the answer oscillator is initiated by the answer hold-off circuit 53.

The terminal control circuit 59 is utilized in the auto-answer mode. When the ring signal is detected it actuates the terminal control circuit to apply line voltage to the appropriate outlets for operation of the entire system. In the manual mode the circuits are actuated at all times to maintain line voltage to the system. The function is for unattended operation. In this way for night or absence operation, the terminal and coupler is placed in the auto-answer mode. The circuits are active and will answer automatically; the data will be received, circuit will "hang up," and await another call.

The transmit section of the acoustic coupler system basically converts the data signal from the EIA terminal by way of the terminal input interface 52 into a FSK (frequency shift keyed) carrier at 1,270 Hz (mark) and 1,070 Hz (space) originate mode, for transmission over the telephone system. The tones are converted into their electrical equivalents as required by the user's data terminal equipment. The terminal input interface 52 converts the open-close Teletype contact to a signal for the modulator transistors and provides a data signal to the receive circuitry for full duplex operation.

As pointed out above, the system of the present invention is an originate-answer system. That is, it is operable on two frequencies interchangeably. In this way more than two stations can communicate back and forth. Since the system can originate or answer or either frequency, the system must include circuits operable interchangeably at either frequency. The complications arise in switching from one circuit to another.

Figure 1:
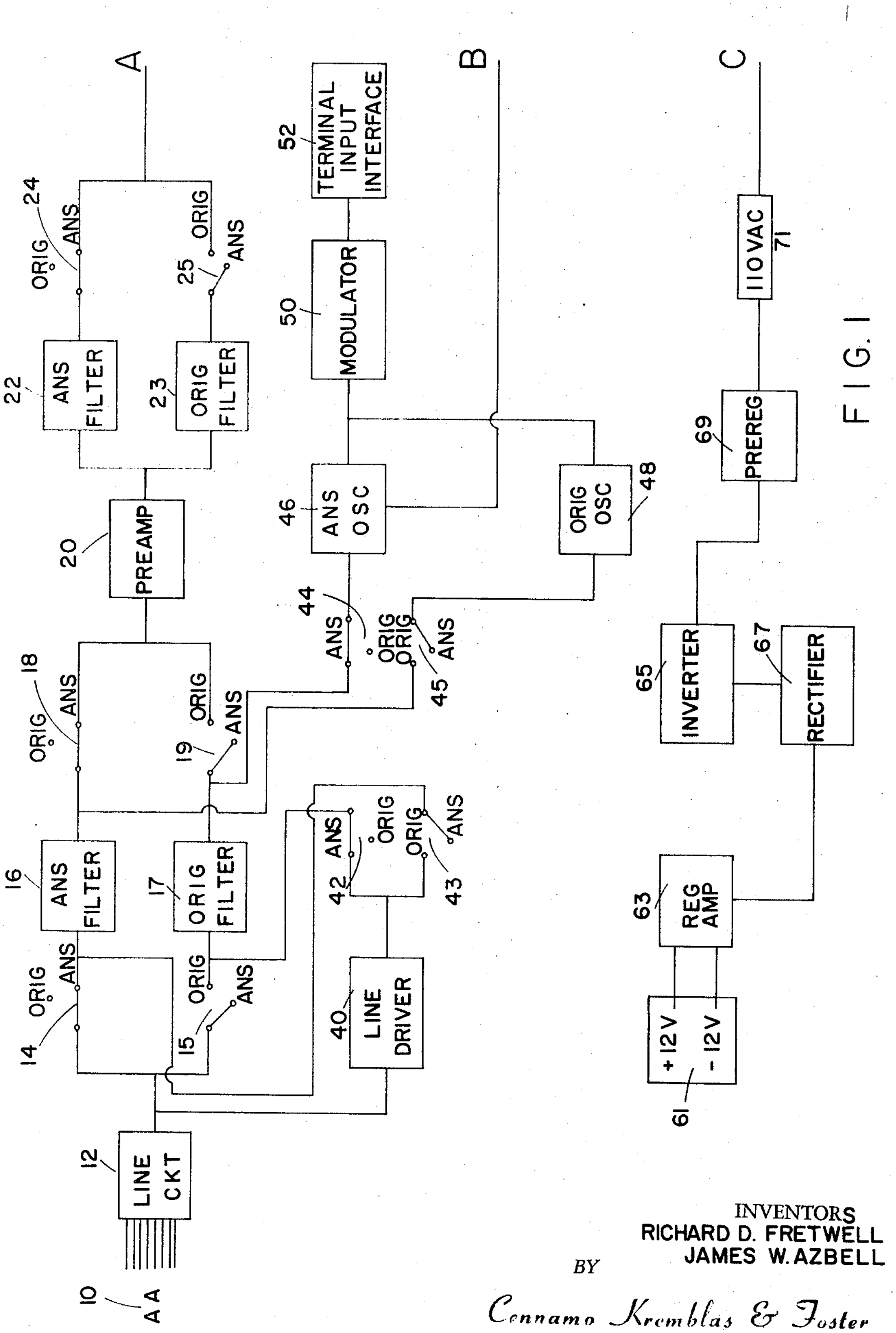
FIG. 1, when placed end-to-end with FIG. 2, is a schematic illustration in block form of the electrical circuitry comprising the coupler of the present invention.
Figure 2:
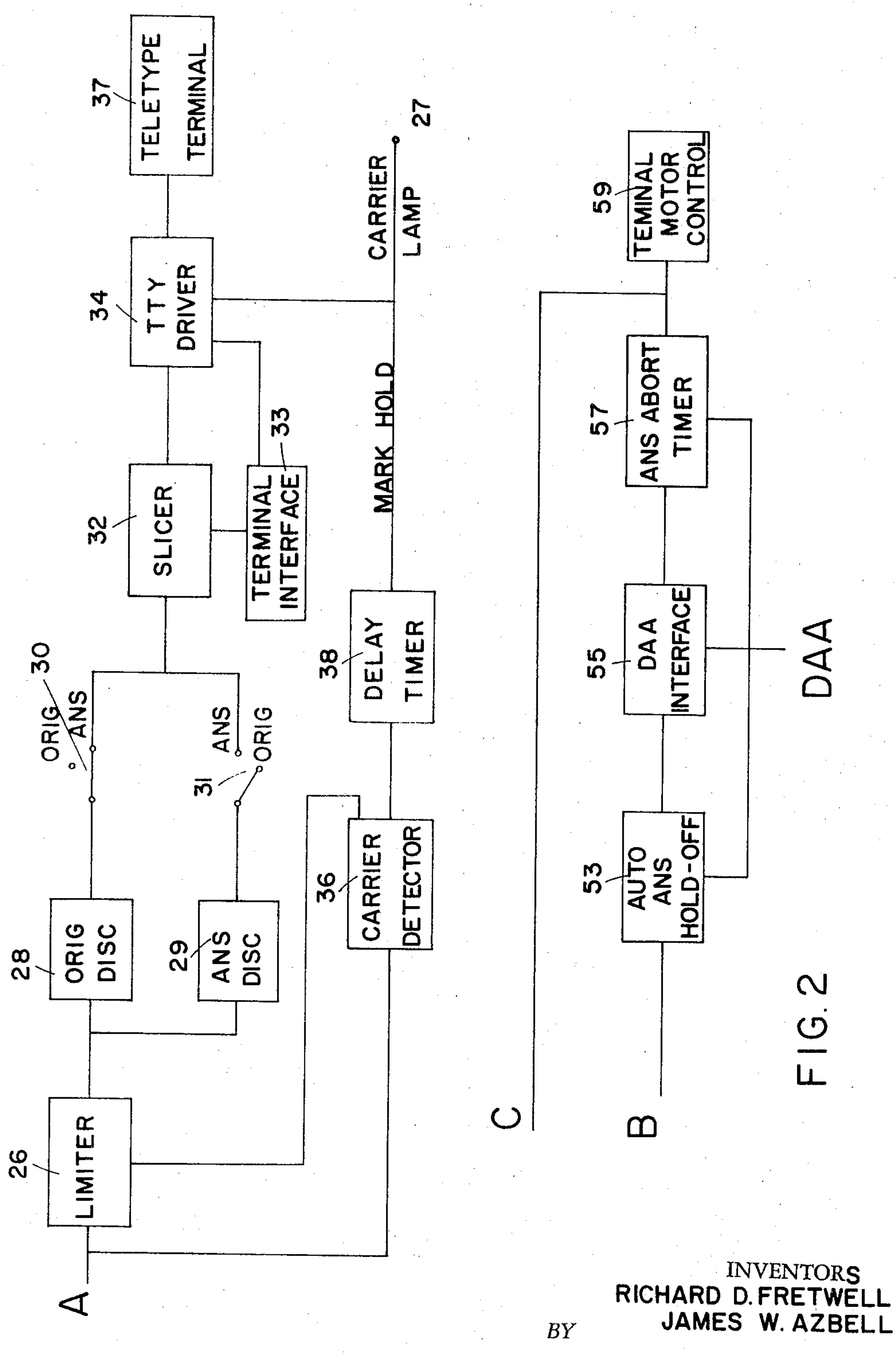

Referring now specifically to the more detailed block schematic of FIGS. 1 and 2, there is shown the data coupler in combination with a standard type of telephone. As in FIG. 5, in this particular embodiment the coupler is wired directly into the telephone as a direct access modem. In practice, there are eight wires shown at 10 connected to the direct access arrangement (DAA) shown as line circuit 12. They include the data tip, data ring, signal ground, ring indicator, off-hook, +20 volts, data mode, and data access (not used). In actuality, a terminal board connecting the eight wires is used for simplicity of installation. Line circuit 12 includes a balanced terminal transformer for isolation purposes.

The preamplifier 20 is an integrated circuit operational amplifier with feedback to provide a gain in excess of 200, with an average gain of approximately 1,000. The amplified output of the preamplifier 20 is filtered either in the originate or answer bandpass filter 22 or 23 — depending on its operational mode. The bandpass filters 22 and 23 have the function of passing the two frequencies of use while rejecting noise and other transient frequency signals.

In a preferred arrangement of components the incoming signals from the line circuit 12 are filtered in answer or originate line filters 16 and 17 prior to being fed to the preamplifier 20. This is to attain more attenuation between the transmit signal and the receive signal — to receive at a lower level and transmit at a higher level.

Figure 4:
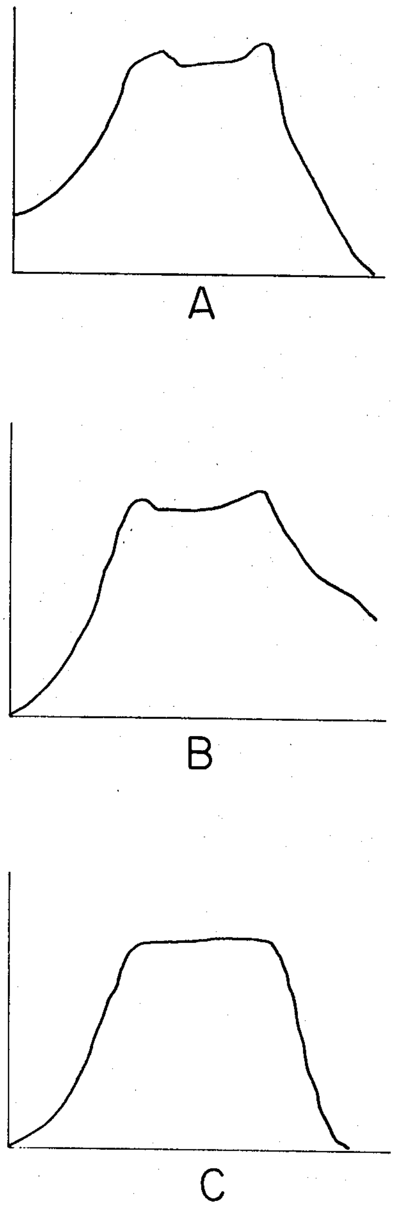
FIG. 4 is another set of electrical waveforms for purposes of understanding the present invention.

With reference for the moment to FIG. 4A and 4B it is to be noted that the leading slope and trailing slopes of the line filters 16 and 17 are the reverse of those of receive filters 22 and 23. That is the slope on the input is steeper than at the output on line filter 16 and 17 but in reverse on receive filters 22 and 23. The line and receive filters are designed to reject adjacent frequencies. The line parameters are chosen for best attenuation above passband in the answer mode; whereas, in the originate mode the line parameters provide best attenuation below the passband. The over-all response, i.e., the waveforms A and B combined, fed to limiter 26 is that shown in FIG. 4C. The bandpass receive filters 22, 23 and line filters 16 and 17 are capacitively coupled double tuned LC circuits.

The tone signal as shown in FIG. 4C from either of the bandpass filters 22–23 is fed simultaneously to limiter 26 and carrier detector 36 (not that FIG. 2 is a continuation of FIG. 1; the two FIGS. joining at AA, BB, and CC). The waveform shown in FIG. 3A is that of the input 10.

The feedback circuit is a nonlinear circuit comprising a pair of transistors. The feedback occurs at approximately 0.6 volts (+ or −) thereby limiting the output of the limiter 26 to the same output for any drive signal.

The carrier detector 36 is operative to determine the presence of a sufficiently large receive tone. The circuitry of carrier detector 36 comprises a pair of transistors for amplification. The output signal of the detector is operational to drive lamp 27 when a sufficient receive carrier signal is present. The amplified signal — data set ready — from carrier detector 36 is also connected to the teletype driver 34 also as hereinafter set forth. In the absence of a sufficient carrier the Teletype driver 34 remains in the "mark hold" state.

Figure 3:
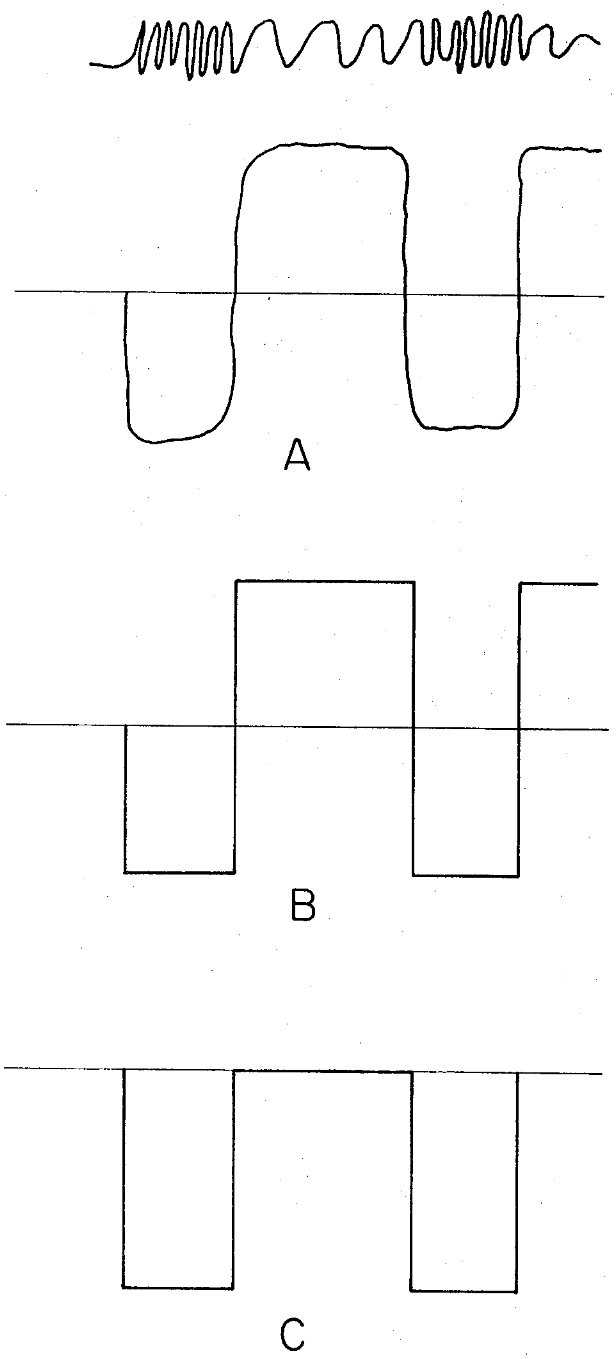
FIG. 3 is a first set of electrical waveforms for purposes of understanding the present invention.
Figure 6:
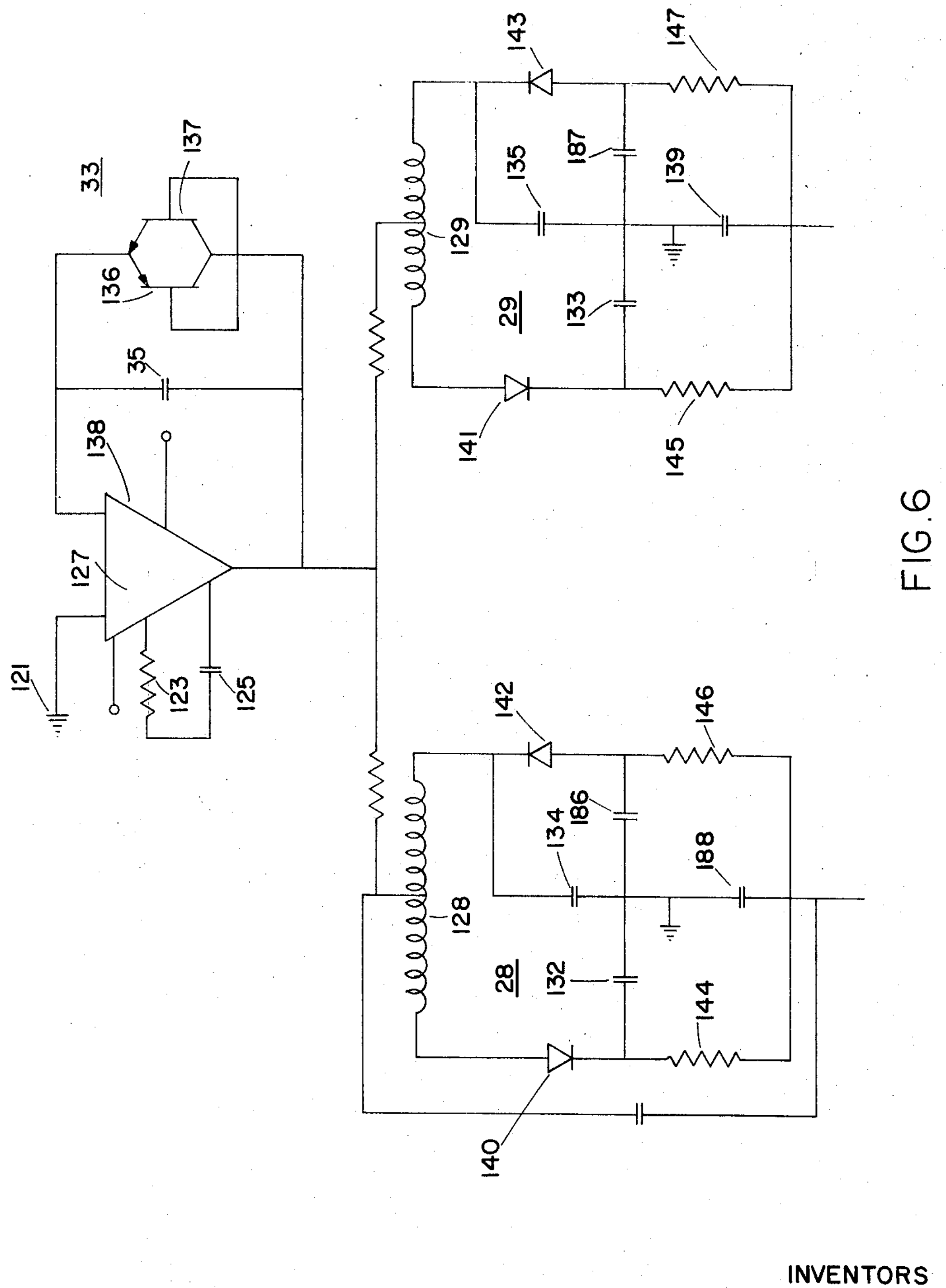
FIG. 6 is a detailed schematic illustration of the improved limiter and discriminator circuits.

The carrier detector 36 output signal as shown in FIG. 3B is fed to the limiter 26 shown in block in FIG. 2; but with reference now to FIG. 6 there is shown the electrical schematic circuit of the limiter 26 of the present invention together with the answer discriminator 29 and originate discriminator 28. The limiter 26 — an integrated circuit operational amplifier 138 with feedback provided by the bridge transistors 33 and coupling capacitor 35 — provides hard limiting to signals from the bandpass filter 22 or 23 in excess of 100 mv. The limiting action causes a "capture" effect on the signal and thereby discriminates against noise. The output of the limiter 26 is of constant amplitude and approximates a square wave.

The limiter circuit shown in FIG. 6 is particularly distinctive in its feedback circuit. The four diode feedback circuit conventional bridge rectifier found in limiting circuits has been replaced by the bridge rectifier 33 having a pair of transistors 136 and 137. The amplifier circuit 138 is a very high gain amplifier with little feedback. The feedback transistor circuit 136 and 137 limits the output of the amplifier 138 to a signal having only a fraction of a volt. The improved result of the transistors 136 and 137 over the four diode circuits previously used in the sharper characteristics — resulting in harder limiting without the normally attendant oscillation problems. The function of the limiter circuit 26 is to convert a varying amplitude signal, FIG. 3A, into a square wave, FIG. 3B. As seen in FIG. 3A and 3B, the zero crossing of the square wave is the same as the varying input signal.

The tone signals from the limiter 26 of FIG. 2 are fed to the originate discriminator 28 or answer discriminator 29. In either of the discriminator circuits 28 or 29, the two frequency signals are detected. The output from either discriminator is a bipolar signal as shown in FIG. 3C corresponding to the data being received. The signal is positive when lower than 2,125 Hz and negative when higher than 2,125 Hz. In other words, the data signal is converted to baseband data which is dc with low frequency components.

With reference again to FIG. 6 there is also shown schematically the dual discriminator circuits; a first discriminator 28 for originate and the second discriminator 29 for answer. In the prior circuit of the aforementioned copending patent application, a single discriminator was utilized with switching capacitors for tuning. Particularly significant with the use of dual discriminators in the present invention is that the inductance 128 serially connecting in a closed loop series connection, the transistors 140 and 142 of the discriminator 128, and inductance 129 serially connecting in a closed loop series connection, the transistors 141 and 143 of the discriminator 129, are increased. The capacitance made up of capacitors 132 and 134 and 188 in the discriminator 128 and capacitors 133, 135 and 139 in the discriminator 129 is decreased. It has been found that the L over C ratio determines the maximum modulation rate. Therefore, by increasing the modulation rate, operation at a higher baud has been achieved. With dual discriminators the values desired may be chosen without compromise as done with a single discriminator and switching circuits.

Again referring to FIGS. 1 and 2 and also the simplified block schematic of FIG. 5 the output signal from either of the discriminators 28 or 29 is fed to the slicer 32. The purpose of the slicer 32 is to amplify and further increase the signal-to-noise ratio of the detected signal. The output signal of the slicer 32 is a square wave as shown in FIG. 3C and in this preferred embodiment +12 or −12 volts. Specifically, slicer 32 includes an integrated circuit operational amplifier having the input from either discriminator fed thereto simultaneously with ground. An uprighted inverted switch 30–31 (shown mechanically in FIG. 2) "determines" which of the two signals from the discriminator is to be grounded. A pair of resistors provide approximately 50 mv of hysteresis to the slicer 32 circuit. This is to assure that its output signal is a rectangular wave with the sharp transient occurring at the zero crossings of the data signal from either of the discriminators 28 or 29.

The output of the slicer 32 is fed to the Teletype driver 34 simultaneously with the output of the carrier detector 36 — as mentioned above. In the preferred embodiment shown in FIGS. 1 and 2 an additional improvement is made by incorporating the delay timer 38 in the output circuitry of the carrier detector 36. In actual practice delay timer 36 provides a time delay of a second and one-half after the carrier signal is detected by carrier detector 36. The purpose of the delay timer 38 is to disable the echo suppressors for a fixed period of time before the signal will trigger the transmit oscillator 46. It has been found necessary that there be at least 400 milliseconds between the answer-back tone and the time for transmit back. If the echo suppressors are not disabled during this period of time, garbling will occur in the transmission of data. Also with a time delay spurious noises from the room and telephone line are avoided.

The Teletype terminal 37 does not accept the bipolar EIA 33 data signal. The Teletype driver 34 converts the EIA signal from interface 33 to the 20 ma signal required by the Teletype terminal 37. The output of the Teletype driver 34 is a constant current pulse. Specifically, the Teletype driver 34 comprises a series of diodes and resistors that combines the data signal from the slicer 20, the carrier present signal from the detector 36 and delay timer 38, and the Teletype keyboard signals from interface 33. The diodes and resistors are operative in a conventional manner to combine — additively — the aforementioned signals. In the absence of a carrier the Teletype circuit is held "on" to prevent chattering. The combined signals are fed to a pair of driver transistors.

The automatic answer hold-off circuit 53, the DAA interface circuit 55, the answer abort timer 57 and the terminal motor control circuit 59 are shown in block in FIG. 2. These circuits are not in the original circuitry of the acoustic coupler described in the copending patent application.

The purpose of the abort timer 57 is to set a time limit between the call signal and the reception of data. In operation when in the automatic answer mode a ring will be detected initiating the timer 57. If data is not received within the predetermined period of time — for instance 30 seconds — the answer abort timer 57 disconnects the telephone line from the acoustic coupler. The equipment is restored to its pre-ring condition and awaits another ring. On the other hand if data is received within the time allotted, the interface circuit 55 is held in the "on" position by the carrier detector 36. The circuit continues in this position as long as data is being received.

The direct access arrangement (DAA) interface circuit is basically the circuit that controls the telephone line by using the on-hook, off-hook lead (OH lead). The direct access arrangement (provided by the telephone company) gives a signal which initiates the timer 57. The telephone line is then connected to the off-lead connecting the telephone to the line. When no data is received or when the reception of data is completed, the timer will have timed off and the off-lead will switch to on-hook and await another call.

Figure 7:
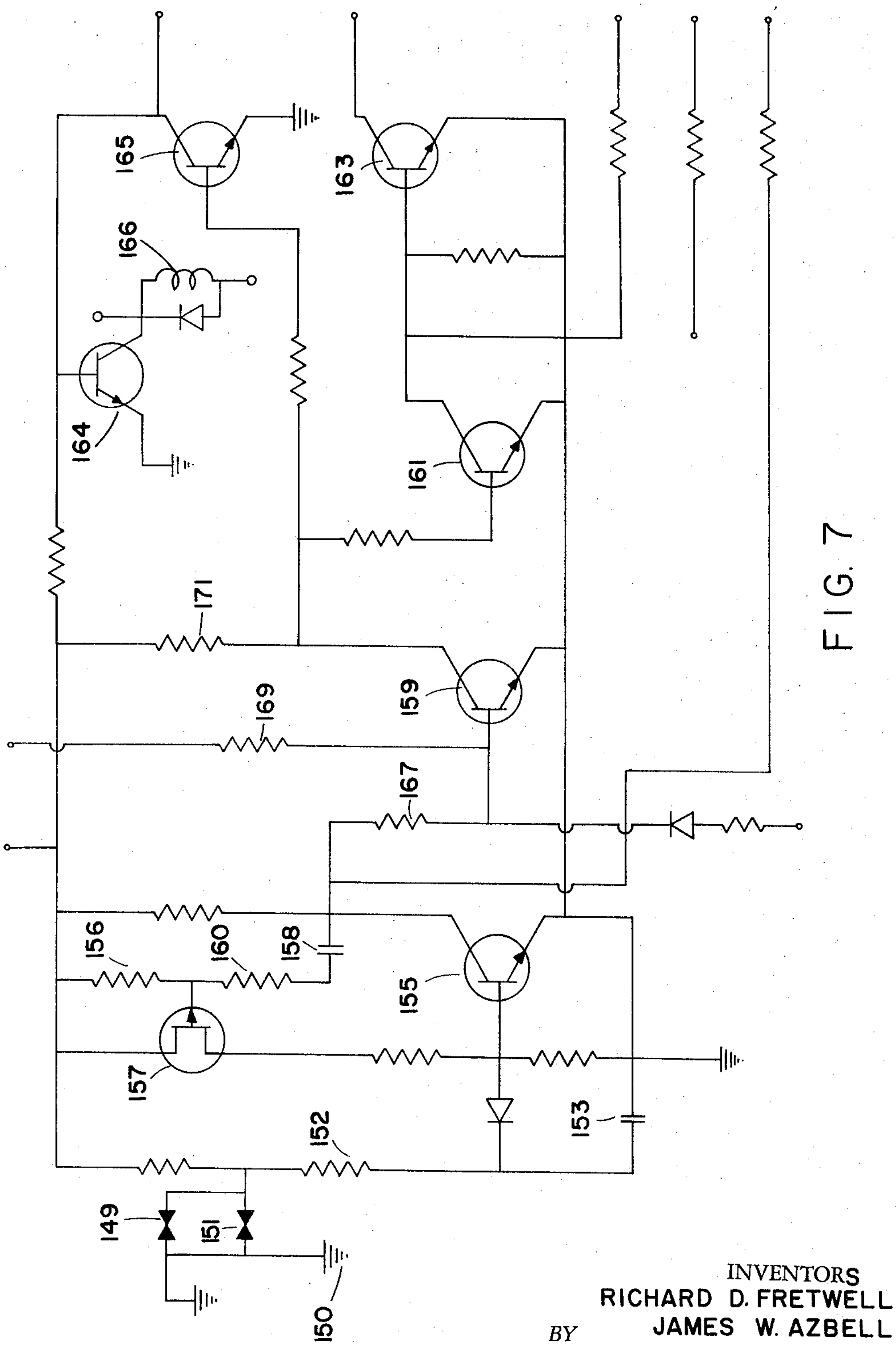
FIG. 7 is a detailed schematic illustration of the improved DAA interface answer abort timer, and other circuitry.

With specific reference to FIG. 7, there is shown the circuitry for the answer abort timer, hold-off and terminal control. To avoid unwanted momentary contact closures by spurious signals, relay 151 in the telephone box controls the initiation of the timer. The relay 151 so adjusted that a full ring cycle is needed to initiate the timer. A manual over-ride switch 149 is provided to maintain all circuits operative in manual operation. Resistor 152 and capacitor 153 connected in a closed loop series connection with transistors 155 and 157 form the short delay network (30 seconds). The transistor 155 is normally biased on. A ring lead via the direct access arrangement grounds the circuitry. With this grounding the transistor 155 is biased off. The source gate field effect transistor 157 is on since there is no bias applied thereby permitting transistor 155 to be on. The voltage between the gate of transistor 157 and the source approaches zero since capacitor 158 is fully charged. The voltage at the collector of transistor 155 is also essentially zero. The other side of capacitor 158, which is the key to the field effect transistor 157, is approximately +12 volts.

With an incoming ring the ring lead is grounded and the transistor 155 is turned off. The collector of the transistor 157 therefore rises to a potential approximating that of the positive side of the capacitor 158 — at this time approximately +12 volts. The field effect transistor 157 is a "p" channel unit with the capacitor 158 commutating the change of voltage on the collector from −0 to 12 volts. The voltage on the positive side of the capacitor 158 having a previous value of +12 volts goes to approximately +24 volts immediately. This puts a 12 volt positive bias on the gate source lead of the transistor 157. This turns off the transistor 157 and no further current will flow to the transistor 155.

This condition remains until capacitor 158 discharges through resistor 156 and the voltage between the gate and the source of the field effect transistor 157 approaches half value — 6 volts — before it starts to turn on. This forces the current into the base of transistor 155 causing it to turn on and the collector voltage to fall — which in turn regenerates the field effect transistor 157. At this time the entire circuit regeneratively collapses back to its original state. Resistor 160 prevents a very high current from flowing through the field effect transistor 157 during this process. This is necessary since the capacitor 158 charges quickly between the forward bias gate source junction of the field effect transistor 157, resistor 160, capacitor 158 and the collector-emitter resistance which is quite low.

The function of transistor 159 is to retain the telephone line or to disconnect it. Transistor 159 has connected to its base the timer input and also the carrier detector signal from detector 36. When a ring is answered and no data is received for the 30 second delay, transistor 159 is turned off. This in turn causes transistor 155 to turn on and then field effect transistor 157 to turn off.

If data is received in the first thirty seconds after the phone rings, transistor 159 is held on by the carrier signal from the delay timer. This in turn holds transistor 155 off and turn on transistor 163. In this condition an off-hook indication is given to the direct access arrangement and thereby retaining the telephone line.

When upon completion of the data the output of the delay timer goes negative and then to ground turning off transistor 159, turning on transistor 161, and turning off transistor 157. This gives an on-hook indication to the direct access arrangement, i.e., that the phone is hung up and another incoming call is awaited.

In the manual answer mode the ring-input ground is made to simulate the ring at all times. This disables the answer abort timer completely — forcing the OH lead to be off-hook continuously. In this state transistor 163 is on at all times.

In the auto-answer mode when a ring is received the answer abort timer starts — as described above. A very short time later (2 to 5 seconds) the answer oscillator is initiated by the answer hold-off circuit 53. Telephone company specifications require the delay.

The terminal control circuit 59 is utilized in the auto-answer mode. As indicated above, when the ring signal is detected, transistor 159 turns on which turns off transistors 165, and also turns on transistor 164. This transistor 164 is the relay 166 control transistor, that is, it actuates relay 166 to apply line voltage to the appropriate outlets for operation of the entire system.

In the manual mode the relay's 166 contacts are closed at all times to maintain line voltage to the system. The function is for unattended operation. In this way for night or absence operation the terminal and coupler is placed in the auto-answer mode. The circuits are active and will answer automatically; the data will be received, the circuits will "hang up," and await another call.

Referring again to FIG. 2, switch 30 having the Teletype driver 34 signal connected thereto is operative to hold the Teletype circuit in the mark position if no carrier is present. In the mark position Teletype chatter is eliminated. With the full-half switch 31 in the full position the keyboard signal returns to the Teletype driver 34 to provide full duplex operation.

The transmit section of the coupler system basically converts the data signal from the EIA by way of the terminal input interface 52 into a FSK (frequency shift keyed) carrier at 1,270 Hz (mark) and 1,070 Hz (space) originate mode, for transmission over the telephone system. The tones are converted into their electrical equivalents as required by the user's data terminal equipment.

The answer oscillator circuit 46 and originate oscillator circuit 48 electronically switch resistors to modulate the frequency of oscillation. A modulator transistor switches in a resistor to cause the oscillator to run at its higher frequency. When the modulator 50 is off the oscillator runs at its lower frequency. The switching circuits 44 and 45 select which of the oscillators transmits over the line. A circuitry in each oscillator 46, 48 regulates the oscillator output level and an amplifier raises the oscillator output level sufficiently to drive the output transducer. The terminal input interface 52 converts the open-close Teletype contact to a signal for the modulator transistors and provides a data signal to the receive circuitry for full duplex operation.

Since the system is operable on two frequencies interchangeably, more than two stations can communicate back and forth. The system can originate or answer on either frequency and hence must include circuits operable interchangeably at either frequency. The complications arise in switching from one circuit to another.

FIGS. 1 and 2 depict switches 14 and 15 and switches 42 and 43 for input to answer line filter 16 and originate line filter 17; switches 17 and 18 for answer/receive filter 22 and originate/receive filter 23; switches 24 and 25 for input to limiter 26; switches 30 and 31 for the originate discriminator 28 and answer discriminator 29; and switches 44 and 45 for originate oscillator and answer oscillator.

Figure 8:
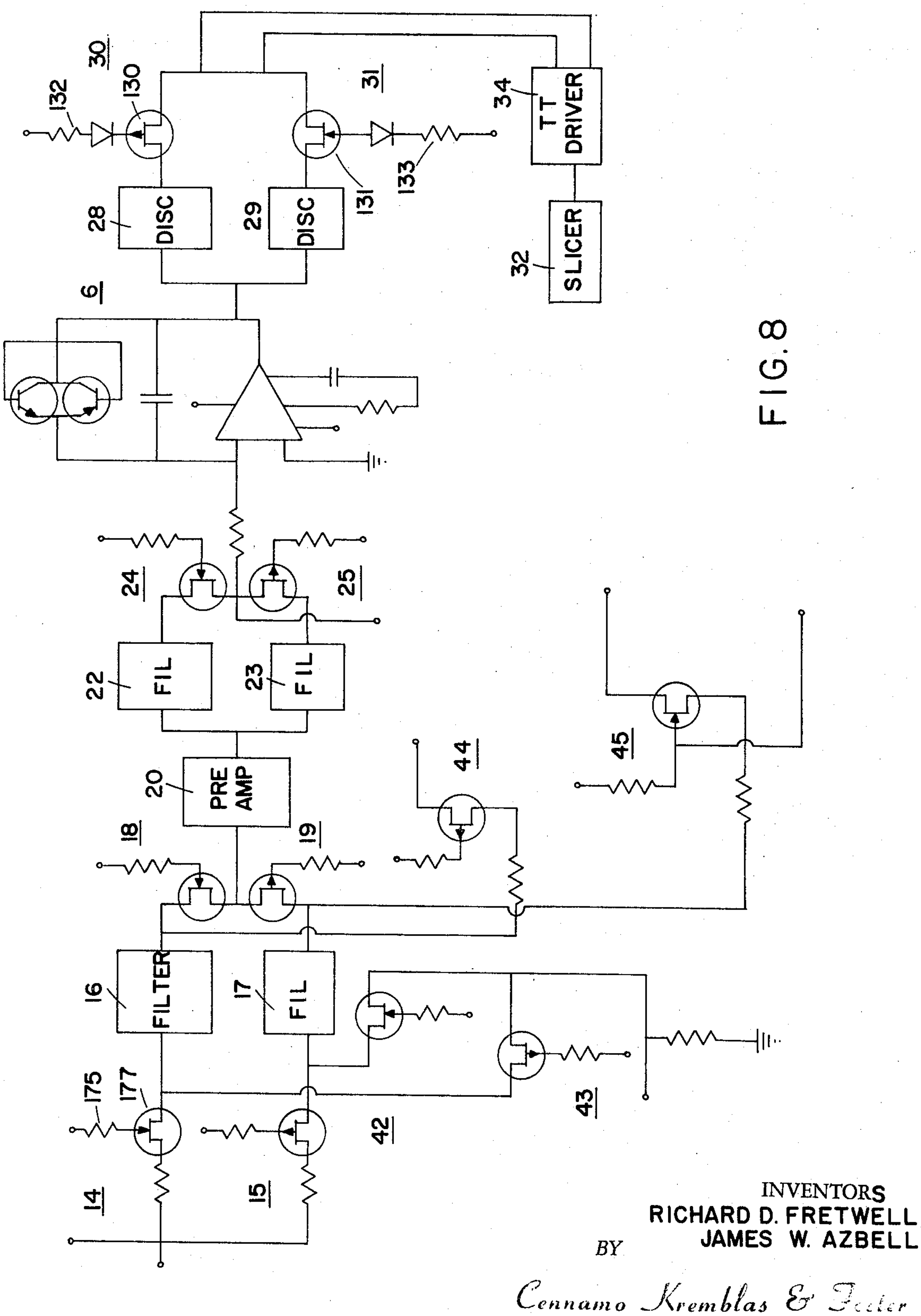
FIG. 8 is a detailed schematic illustration of the field effect transistor (FET) switching circuits utilized in the preferred embodiment of the present invention.

With reference to FIG. 8 there is shown schematically the switching circuitry employed in the preferred embodiment. Particularly unique in the data communication two-way systems are the field effect transistor (FET) switches in lieu of the mechanical or other type electronic switches heretofore utilized. In operation of each switch when the gates of field effect transistors are forward biased they exhibit less than 700 ohms. When the gates of the field effect transistors are reverse biased, they exhibit a very high impedance. The gate impedance of each field effect transistor is very high — accordingly a very high resistance (10 meg ohm), resistance 175 of field effect transistor 177, is put in the circuit. This resistance is a current limiter that prevents reverse currents when the transistor circuit is conducting. That is, it limits the current flow on the field effect transistor when it is conducting. Of course, when the field effect transistor is not conducting the resistance is not applicable.

The power source 61 of FIG. 1 provides a −12 or +12 volts regulated in the regulator 63 at 100 ma for the entire system. The inverter 65, rectifier 67, and preregulator 69, are those shown in the copending patent applications to Edwin E. Mason, and assigned to Design Elements, Inc.: Ser. No. 98,627, filed Dec. 16, 1970; for "Solenoid Drive Circuit;" Ser. No. 101,503, filed Dec. 28, 1970; for "Inverter Starter Circuit," Ser. No.

101,502, filed Dec. 28, 1970; for "Improved Solenoid Starter Circuit."

Although certain and specific embodiments have been shown, it is to be understood that modifications may be made without departing from the true spirit and scope of the invention.

What is claimed is:

1. A data system for communication over the standard type of telephone line in the answer or originate modes at interchangeable frequencies to a time shared computer, Teletype, or other data line comprising:

a telephone handset operable to receive an acoustical dual frequency signal, a carrier detector having a predetermined level output representative of a suitable carrier level, means coupling said carrier detector to said telephone signal including an originate and an answer line filter, a limiter also connected to said coupling means for converting said carrier signal to a constant-amplitude noise-free signal, said limiter including an integrated circuit operational amplifier with feedback circuit comprising a pair of transistors in a bridge configuration to limit signals to a predetermined level and to provide a signal of constant amplitude, an originate discriminator and an answer discriminator for detecting said dual frequency signal to produce a bipolar output signal corresponding to the data received, a slicer operable to increase the signal-to-noise ratio of said discriminated signal and to produce a squarewave output, a Teletype driver for combining the data signal from said slicer and the carrier present signal from said carrier detector with that of preselected keyboard signals, a transmit section including an originate oscillator and an answer oscillator for generating a dual frequency signal, means for providing said dual frequency signal to said transmit section for duplex operation, a plurality of field effect transistor switching circuits, including a first and second field effect transistor switching circuit for said originate discriminator and said answer discriminator, and a third and fourth field effect transistor switching circuit for said originate oscillator and said answer oscillator; said switching circuits operable to activate interchangeably said discriminators and said oscillator and a fifth and sixth field effect transistor switching circuit for said originate line and answer line filters.

2. A data communication system as set forth in claim 1 wherein said originate and an answer line filter further comprises: a preamplifier, and an originate and answer receiver filter; said line filters having component parameters to provide a steeper attenuation on the input relative to that of the output, whereas said receive filters component parameters provide a steeper attenuation on the output relative to that of the input; and means interconnecting said preamplifier between aid line and receive filters.

3. A data communication system as set forth in claim 1 wherein said switching circuits comprise a seventh and eighth field effect transistor switching circuit for said originate/receive and answer/receive filters.

4. A data communication system as set forth in claim 1 further comprising means for coupling said discriminator circuits to the output of said limiter circuit and to the input of said slicer circuit, and wherein said discriminator coupling means further comprises said second and third field effect switching circuit.

5. A data communication system as set forth in claim 1 further comprising a delay timer interconnecting said carrier detector to said Teletype driver, said delay timer operable to provide a predetermined delay of said carrier signal prior to applying same to said driver.

6. A a data system for communication over the standard type of telephone line in the answer or originate modes at interchangeable frequencies to a time shared computer, a Teletype, or other data line comprising:

a telephone handset operable to receive an acoustical dual frequency signal, a carrier detector having a predetermined level output representative of a suitable carrier level, means coupling said carrier detector to said telephone signal including an originate and an answer line filter, a limiter also connected to said coupling means for converting said carrier signal to a constant-amplitude noise-free signal, an originate discriminator and an answer discriminator for detecting said dual frequency signal to produce a bipolar output signal corresponding to the data received, a slicer operable to increase the signal-to-noise ratio of said discriminated signal and to produce a squarewave output, a Teletype driver for combining the data signal from said slicer and the carrier present signal from said carrier detector with that of preselected keyboard signals, a transmit section including an originate oscillator and an answer oscillator for generating a dual frequency signal, means for providing said dual frequency signal to said transmit section or duplex operation, a first and second switching circuit for said originate discriminator and said answer discriminator, and a third and fourth switching circuit for said originate oscillator and said answer oscillator; said switching circuits operable to activate interchangeably said discriminators and said oscillator;

an automatic answer hold-off circuit including an abort timer and an interface circuit, said abort timer operative after a predetermined period to hold off or on said interface circuit dependent upon the receipt of data or not; and wherein said interface circuit further comprises a transistor circuit, means connecting said timer signal and said carrier detector signal to the base of said transistor, said transistor circuit rendered conducting upon the receipt of said timer signal and said carrier signal.

7. A data communication system as set forth in claim 6 wherein said abort timer is initiated by the receipt of the telephone ring and operative after a predetermined time to disconnect the telephone line in the absence of the receipt of data.

8. A data communication system as set forth in claim 6 wherein a relay circuit is connected between the line ring input and said abort timer, said circuit adjusted to prevent said initiation of said abort timer unless a full ring cycle is received.

9. A data communication system as set forth in claim 6 further comprising a manual mode for maintaining at all times line voltage to said answer circuits.

10. A data communication system as set forth in claim 6 wherein said abort timer comprises a resistive and capacitive network.

11. A a data system for communication over the standard type of telephone line in the answer or originate modes at interchangeable frequencies to a time shared computer, a Teletype, or other data line comprising:

- a telephone handset operable to receive an acoustical dual frequency signal,
- a carrier detector having a predetermined level output representative of a suitable carrier level,
- means coupling said carrier detector to said telephone signal including an originate and an answer line filter,
- a limiter also connected to said coupling means for converting said carrier signal to a constant-amplitude noise-free signal,
- an originate discriminator and an answer discriminator for detecting said dual frequency signal to produce a bipolar output signal corresponding to the data received,
- a slicer operable to increase the signal-to-noise ratio of said discriminated signal and to produce a squarewave output,
- a Teletype driver for combining the data signal from said slicer and the carrier present signal from said carrier detector with that of preselected keyboard signals,
- a transmit section including an originate oscillator and an answer oscillator for generating a dual frequency signal,
- means for providing said dual frequency signal to said transmit section for duplex operation,
- a first and second switching circuit for said originate discriminator and said answer discriminator, and a third and fourth switching circuit for said originate oscillator and said answer oscillator; said switching circuits operable to activate interchangeably said discriminators and said oscillator;
- a power supply and a terminal control circuit connected thereto, an answer circuit, and an automatic answer hold-off circuit; said answer circuit operative upon the receipt of a ring signal, said answer circuit connected to said terminal control for applying, when operative, power from said supply to said terminal control.

12. A data communication system as set forth in claim 11 wherein said terminal control circuit comprises a transistor and an interconnecting relay.

* * * * *